Patented July 7, 1953

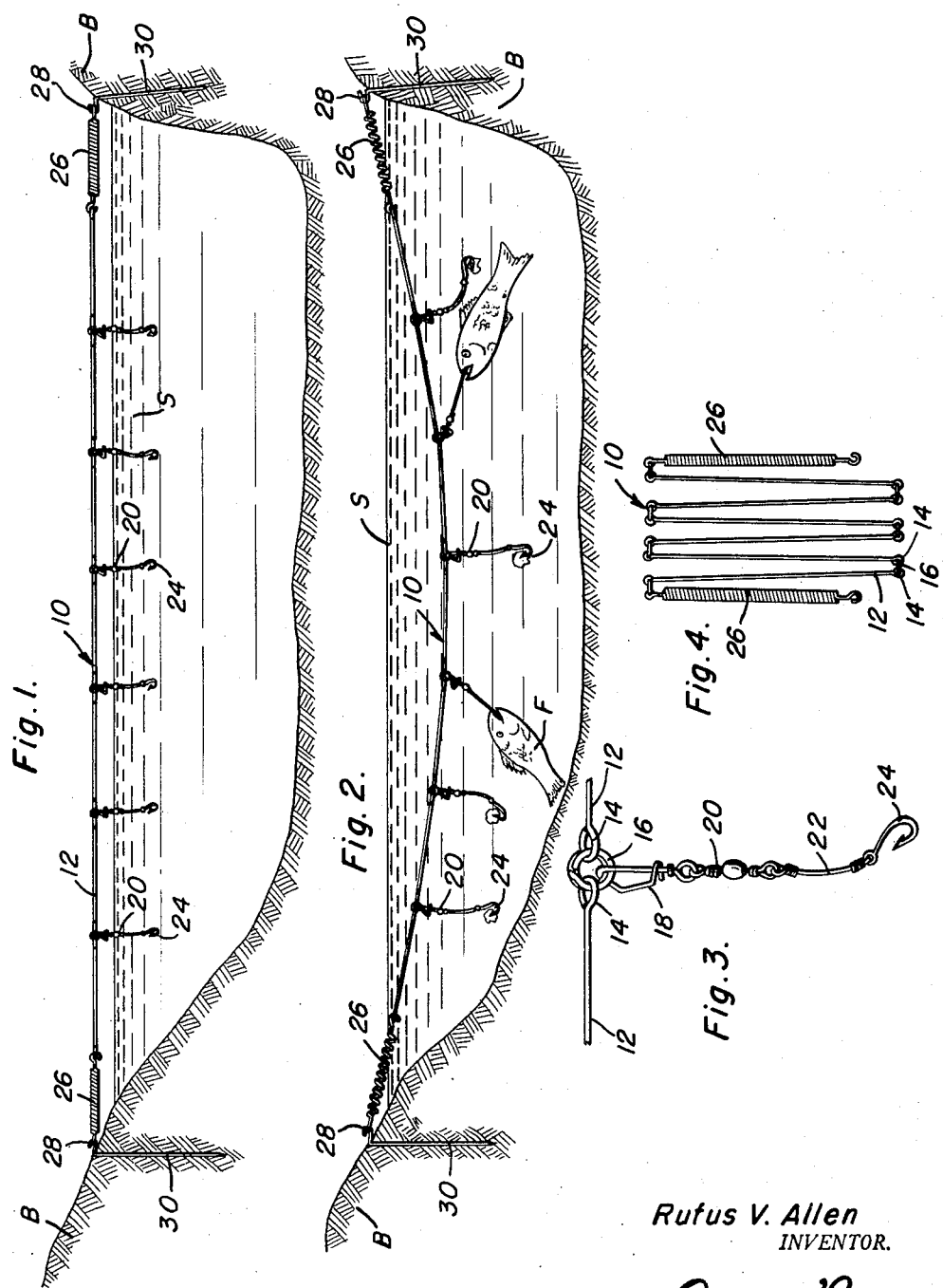

2,644,263

UNITED STATES PATENT OFFICE 2,644,263

FISHING DEVICE

Rufus V. Allen, Chino, Calif.

Application January 31, 1951, Serial No. 208,702

2 Claims. (Cl. 43—27.4)

This invention relates to new and useful improvements in fishing devices and the primary object of the present invention is to provide an expansible articulated member that is extended across a body of water and which supports a plurality of hooks.

Another very important object of the present invention is to provide a fishing device including an elongated member formed of wire links and supporting depending hooks and spring means securing the ends of the member to the ground whereby the member may spring upwardly to hook fish in response to engagement of one or more hooks by a fish.

A further object of the present invention is to provide a fishing device whose length may be quickly and readily reduced or increased in a convenient manner due to the interconnecting means between adjacent links of the elongated hook supporting member.

A still further aim of the present invention is to provide a fishing device that is so constructed as to permit the same to be folded into a small and compact article for shipment or storage.

Other objects and advantages reside in the details of construction and operation as more fully hereinafter described and claimed, reference being had to the accompanying drawings forming part hereof, wherein like numerals refer to like parts throughout, and in which:

Figure 1 is a view showing the invention extending between the banks of a stream;

Figure 2 is a view similar to Figure 1 and showing fish hooked on the device;

Figure 3 is an enlarged view showing the manner in which adjacent links are connected together; and Figure 4 is a view showing the invention folded into a small article for carrying.

Referring now to the drawings in detail, wherein for the purpose of illustration, there is disclosed a preferred embodiment of the present invention, the numeral 10 represents an elongated articulated member composed of a plurality of wire links 12 having terminal eyes 14. A group of split rings or helical springs 16 join the eyes of adjacent links and removably secure the adjacent links together.

A wire clip 18 is secured to each ring 16 and the clips 18 support swivels 20 to which the leaders 22 of hooks 24 are attached.

The ends of the member 10 support a pair of the rings 16 to which the inner ends of a pair of coil springs 26 are secured. The outer ends of the coil springs 26 are secured to the upper terminal hooks 28 of a pair of anchor rods or prongs 30.

In practical use of the present invention the prongs 30 are inserted into opposite banks B of a stream S with the hooks 24 depending into the stream S. The hooks 24 are baited and as a fish F bites a baited hook the member 10 will spring upwardly to hook the fish.

The links 12 prevent untanglement of the member 10 and the rings 16 function as couplers as well as hook supports. The rings 16 are readily removed from the links to reduce the length of the member 10 and to permit additional links to be incorporated in the member 10 to increase its length.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

The springs 26 are quite important in the device described inasmuch as they prevent the line from breaking and these springs also tend to prevent fish from escaping when they are once hooked on the line. The springs 26 also allow the fisherman to tie the line to any solid object without danger of the line breaking.

Having described the invention, what is claimed as new is:

1. A fishing device comprising a plurality of elongated wire links having terminal eyes, convoluted rings engaging and joining the eyes of adjacent links, and a hook carried by each ring, said plurality of wire links including an end pair of links, a pair of coil springs having inner ends attached to the end links, and anchoring prongs secured to the outer ends of said coil springs, said coil springs being adapted to spring said hooks in response to striking of said hooks by fish.

2. A fishing device comprising an elongated articulated member composed of a plurality of elongated wire links having terminal eyes and rings engaging and joining the eyes of adjacent links, swivels attached to the rings, fishhooks supported by said swivels, a pair of coil springs having inner ends secured to the ends of said member, and anchoring rods attached to the outer ends of said coil springs, said coil springs being adapted to spring said hooks in response to striking of said hooks by fish.

RUFUS V. ALLEN.

References Cited in the file of this patent

UNITED STATES PATENTS

| Number | Name | Date |
|---|---|---|
| 294,106 | Baker | Feb. 26, 1884 |
| 463,400 | Frost | Nov. 17, 1891 |
| 578,248 | Layne | Mar. 2, 1897 |
| 903,402 | Patterson | Nov. 10, 1908 |
| 1,163,193 | Althoff | Dec. 7, 1915 |
| 1,723,814 | Scholl | Aug. 6, 1929 |
| 2,382,677 | Thomas | Aug. 14, 1945 |
| 2,564,260 | Houser | Aug. 14, 1951 |

FOREIGN PATENTS

| Number | Country | Date |
|---|---|---|
| 573,692 | Great Britain | Dec. 3, 1945 |